(12) United States Patent
Belton, Jr. et al.

(10) Patent No.: US 10,158,637 B1
(45) Date of Patent: *Dec. 18, 2018

(54) OPERATIONAL SUPPORT FOR NETWORK INFRASTRUCTURES

(71) Applicant: Wells Fargo Bank, N.A., San Francisco, CA (US)

(72) Inventors: Lawrence T. Belton, Jr., Charlotte, NC (US); Peter A. Makohon, Charlotte, NC (US); Scott A. Keoseyan, Matthews, NC (US); Jon Gabel, Charlotte, NC (US); Robert G. Yelton, Jr., Charlotte, NC (US); Ryan B. Benskin, Charlotte, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/629,168

(22) Filed: Jun. 21, 2017

Related U.S. Application Data

(63) Continuation of application No. 14/145,659, filed on Dec. 31, 2013, now Pat. No. 9,716,718.

(51) Int. Cl.
*H04L 29/06* (2006.01)
*H04M 3/22* (2006.01)
*H04W 12/06* (2009.01)
*H04M 3/42* (2006.01)

(52) U.S. Cl.
CPC ...... *H04L 63/0892* (2013.01); *H04M 3/2263* (2013.01); *H04W 12/06* (2013.01); *H04M 3/42059* (2013.01)

(58) Field of Classification Search
CPC ............ H04L 63/0892; H04M 3/2263; H04M 3/42059; H04W 12/06
See application file for complete search history.

(56) References Cited

U.S. PATENT DOCUMENTS

| 7,072,337 | B1 | 7/2006 | Arutyunov et al. |
| 7,979,245 | B1 * | 7/2011 | Bourlatchkov ..... G06F 11/3409 703/2 |
| 2002/0083156 | A1 | 6/2002 | Wysoczynski |
| 2002/0103907 | A1 | 8/2002 | Petersen |
| 2004/0172466 | A1 * | 9/2004 | Douglas ................. H04L 29/06 709/224 |

(Continued)

*Primary Examiner* — John B King
(74) *Attorney, Agent, or Firm* — Walter Haverfield LLP; James J. Pingor

(57) ABSTRACT

Systems and methods that facilitate operational support for network infrastructures are discussed. The disclosed system and method facilitate a unified view of the current state of the network and networked devices including real-time log monitoring and for providing metrics for long term system planning. One such method can include the acts of automatically discovering a device deployed on a network, receiving device and network related data in real-time, determining whether a device is authorized, terminating device network access, filtering device data, validating device configuration, configuring a device and providing an output for use by a user. The disclosed system and method can be utilized, for example, to reduce the time involved in troubleshooting and resolving network issues, for establishing a baseline for network performance and for network capacity planning.

20 Claims, 5 Drawing Sheets

(56) References Cited

U.S. PATENT DOCUMENTS

| | | | |
|---|---|---|---|
| 2005/0128989 A1* | 6/2005 | Bhagwat | H04K 3/65 370/338 |
| 2006/0184998 A1* | 8/2006 | Smith | H04L 12/4679 726/3 |
| 2007/0192128 A1 | 8/2007 | Celestini | |
| 2007/0294757 A1 | 12/2007 | Stephens et al. | |
| 2009/0012966 A1 | 1/2009 | Arai et al. | |
| 2010/0290390 A1* | 11/2010 | Souissi | H04L 63/0236 370/328 |
| 2010/0324945 A1* | 12/2010 | Hessing | G06Q 40/06 705/4 |
| 2011/0246555 A1* | 10/2011 | Hedges | G11B 27/034 709/203 |
| 2014/0007222 A1* | 1/2014 | Qureshi | G06F 21/10 726/16 |

\* cited by examiner

OPERATIONAL SUPPORT FOR NETWORK INFRASTRUCTURES

CROSS-REFERENCE TO RELATED APPLICATIONS

This application is a continuation of and claims priority to U.S. Non-Provisional patent application Ser. No. 14/145,659 entitled "OPERATIONAL SUPPORT FOR NETWORK INFRASTRUCTURES", filed on Dec. 31, 2013; the entirety of the above-noted application is incorporated by reference herein.

BACKGROUND

Modern enterprise network infrastructures continue to grow in size and complexity. As enterprises extend data, voice, and video communications and applications, to a broader set of users, the volume and pace of electronic information flow is growing and networks are more critical than ever. Users expect reliable and predictable network performance, even as new applications are added to the network infrastructure. Information technology (IT) professionals are tasked with implementing and managing these increasingly complex network infrastructures and ensuring that applications and services run well across a wide range of technologies that inherently rely on the network.

As the job of resolving network security, connectivity and performance issues is becoming more complex and more difficult, IT departments continue to strive to reduce costs, increase operational efficiencies and roll out new applications and services to support the business. Services must be delivered within acceptable levels of performance for all users.

Security solutions are often distributed and deployed in larger numbers across an entire enterprise network, from wired to wireless to remote access. Policy management to control to grant, limit, or prevent network access in alignment with appropriate business policy or security compliance requirements and guidelines presents an ongoing challenge.

Monitoring and troubleshooting all the components that make up the enterprise network infrastructure has become even more of a challenge. While traditional network management and monitoring approaches may collect large volumes of data, they can often leave gaps in coverage and involve a great deal of effort to manually configure for a constantly changing set of devices and services. Maintaining network security and operational efficiency in today's distributed enterprise networks demands new solutions to prevent or solve issues and to minimize any impact on the business.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

The disclosure disclosed and claimed herein, in one aspect thereof, includes systems and methods that facilitate a unified view of the current state of a network and networked devices including real-time log monitoring and for providing metrics for long term system planning. One such method can include the acts of automatically discovering a device deployed on a network, receiving device and network related data, determining whether a device is authorized, terminating device network access, filtering device data, validating device configuration, configuring a device and providing an output for use by a user. The disclosed system and method can be utilized, for example, to establish a baseline for network performance, for short-term and long-term capacity planning, and to assess opportunities for cost savings through network workload re-allocation. The disclosed system and method can be used to enhance infrastructure security and to streamline IT network management and support operations.

In another aspect, the disclosure includes systems for the operational support of network infrastructures. One example system can include a discovery component, a processing component, a network component, devices, a storage component and an output component.

The disclosed system and method can provide the user with a unified view across multiple networking technologies and networking equipment vendors. The operational support for network infrastructures system and method offers performance monitoring, alerting, diagnostics, 802.1X network authentication troubleshooting and reporting that are useful for identifying network problems or deficiencies and for making informed decisions about future network upgrade and expansion. In an embodiment, a streamlined web-based dashboard can be used to quickly identify, troubleshoot and resolve problems minimizing end-user impact. The disclosed system and method can also reduce downtime, user wait, configuration errors, security threats and increase productivity and user satisfaction.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
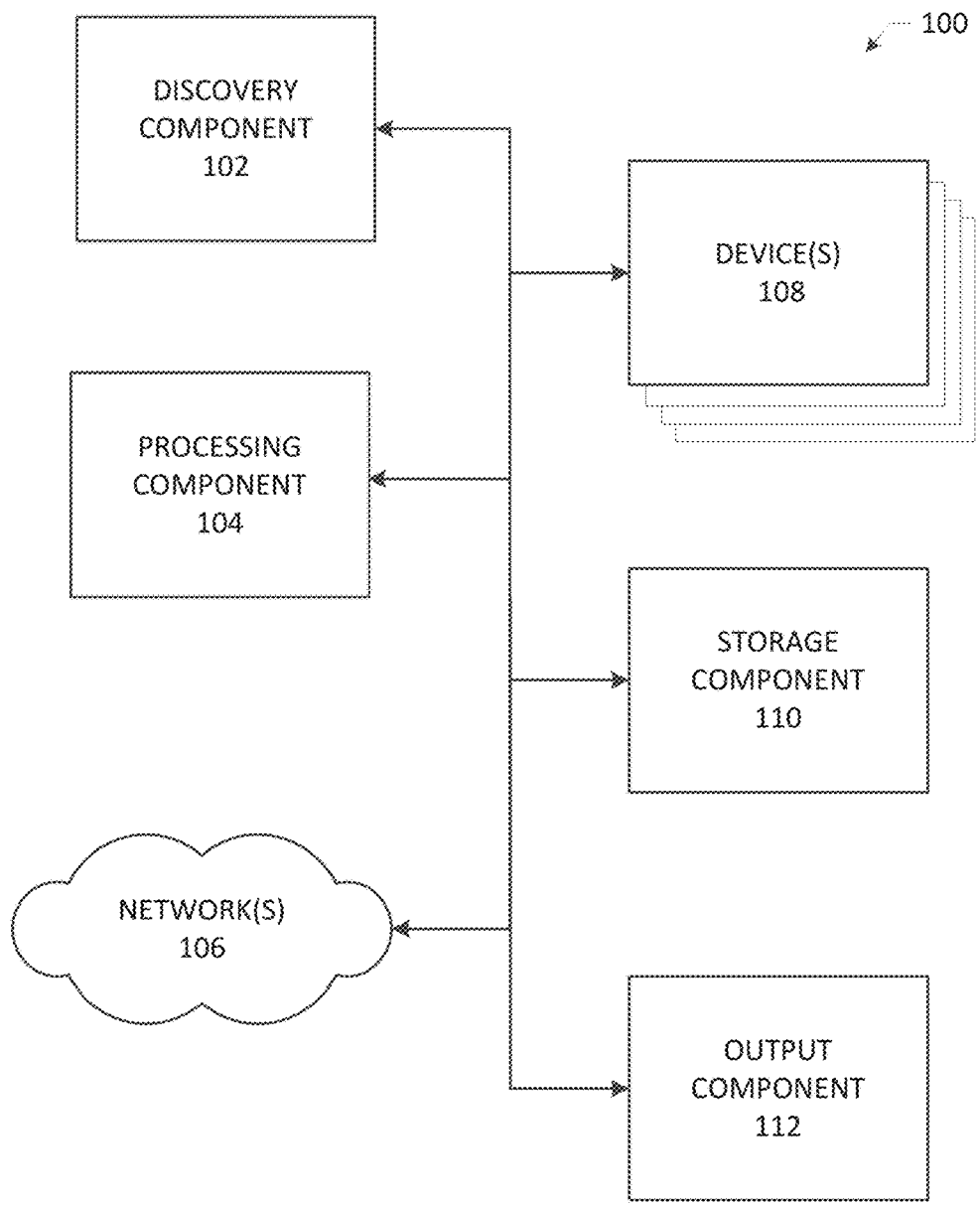
FIG. 1 is an illustration of an example system for operational support for network infrastructures in accordance with aspects of the disclosure.

The following terms are used throughout the description, the definitions of which are provided herein to assist in understanding various aspects of the disclosure.

For the purposes of this disclosure, the term "device" refers to devices, items or elements that may exist in an organization's network, for example, router, switch, server, wireless access point, wireless client, computer, tablet computer, smart phone, thin client, applications, services, files, distribution lists, resources, printer, fax machine, copier, scanner, multi-function device, mobile device, users, groups of users and most any other network or networked element.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein, it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As used in this application, the terms "component" and "system" are intended to refer to a computer-related entity, either hardware or a combination of hardware and software. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer or one network and/or distributed between two or more computers or networks.

Referring initially to the drawings, FIG. 1 illustrates a system 100 that facilitates operational support for network infrastructures according to one or more embodiments. As will be described in greater detail below, aspects can discover devices connected to a network, consolidate, organize and process data related to the devices and the network, thereby providing operational support for the network infrastructure. The system 100 can include a discovery component 102, a processing component 104, networks 106, devices 108, storage component 110 and an output component 112.

Discovery component 102 can discover new devices 108 and existing devices 108 connected to a network or networks 106. Discovery component 102 can be manually triggered to discover devices 108. For example, a systems administrator or other user can trigger discovery component 102 to scan the network 106 on demand. In an embodiment, the discovery component 102 can be configured to continuously scan the network 106 for devices 108. In aspects, the discovery component 102 can be configured to scan a network or networks 106 at pre-determined time intervals to discover and/or identify network devices 106. Network scans scheduled to automatically discover new devices added to the network 106 can save valuable time by minimizing or eliminating manual discovery and manual database entry tasks.

In aspects, the discovery component 102 can be configured to discover and/or identify devices 108 based on Layer 2 and/or Layer 3 protocols and technologies. In an embodiment, an Address Resolution Protocol (ARP) Cache can be queried utilizing Simple Network Management Protocol (SNMP) to obtain information about devices 108 on the network 106. An ARP scan can utilize information obtained from SNMP enabled devices, e.g. routers, to identify devices active on the network 106. In further embodiments, a ping sweep discovery can scan a range of Internet Protocol (IP) addresses and identify devices 108 that respond to Internet Control Message Protocol (ICMP) or SNMP. Link-Layer Discovery Protocol (LLDP) allows attached devices 108 in the network 106 to advertise information about themselves to listening devices. In aspects, devices 108 can continuously broadcast and listen for LLDP messages, and can discover when a device 108 is added or a device 108 is removed from the network 106. LLDP information can be stored in the device as a management information database (MIB) and can be queried with the SNMP. In an embodiment, the topology of an LLDP-enabled network can be discovered by crawling the hosts and querying the MIB.

In others aspects, the discovery component 102 can be configured to discover and/or identify devices 108 utilizing, for example, Domain Name System (DNS) or Windows® Management Instrumentation (WMI).

The discovery component 102 can communicate device information to the storage component 110 and to the processing component 104 for further processing. For example, processing component 104 can receive input from discovery component 102 and storage component 110. In aspects, processing component 104 can use an IP address, media access control (MAC) address and/or the calling-station-id information received from discovery component 102, storage component 110, and other components of system 100, to filter and or sort data and information related to devices 108 and networks 106. In an embodiment, a device calling-station-id comprises the IP address or the MAC address associated with the device 108.

Processing component 104 can obtain or receive device information from discovery component 102. Processing component 104 can poll or query devices 108 discovered or identified by the discovery component 102 and can exchange device information with the other components of the system 100. Information received or obtained by processing component 104 can include device type, system name, system description, system capabilities, manufacturer, software and hardware versions, virtual local area network (VLAN) name, physical location, serial number, asset number, IP address, MAC address, alias name, DNS name, switch name, port name, port description, port number, port speed, port status, power draw (e.g. for Power Over Ethernet devices), link aggregation, authentication status, configuration information and most any other device or network related information.

Processing component 104 can obtain or receive information related to the devices 108 and networks 106. In aspects, processing component 104 can obtain authentication, authorization and accounting (AAA) logs, dynamic host configuration protocol (DHCP) logs, SNMP log data, Syslog messages, lightweight directory access protocol (LDAP) information and most any other directory service information. Processing component 104 can provide real-time log monitoring useful for network infrastructure support, for example, identifying errors, network health monitoring, troubleshooting authentication failures and details of other network or system activities.

In further aspects, processing component 104 can obtain information from discovery component 102, devices 108 and networks 106 related to machines assessed and kept off the network 106 by an assessor, assessor utilization, unique authentications by type, authentication requests, error codes, clientless network access, MAC addresses in MAB (MAC authentication bypass), backed out ports, and guest portal information.

Processing component 104 can obtain or receive information useful for tracking the performance of servers on the network 106 over time. The information can be used, for example, to detect, diagnose and resolve network issues minimizing the impact on users. Processing component 104 can track response time, availability and uptime of most any device, for example, routers, switches and other SNMP enabled devices.

In an embodiment, processing component 104 can obtain or receive and process metrics useful for long term system and network infrastructure planning. For example, processing component 104 can identify and monitor under-utilized and over-burdened network resources and track bandwidth utilization. System 100 facilitates the historical analysis of traffic patterns over a time period to determine where and why bottlenecks in the network are occurring.

The information obtained or received by processing component 104 related to the devices 108 and networks 106 can be utilized, for example, to establish a baseline for network performance, for short-term and long-term capacity planning, and to assess opportunities for cost savings through network workload re-allocation. In aspects, system 100 can be used to enhance infrastructure security and streamline IT network management support operations.

In other aspects, a user (e.g. a network administrator) can be made aware when an unauthorized device accesses the network 106. Unauthorized, or rogue, network devices can include, for example, a rogue switch or wireless access point. Discovery component 102 can include a scanning feature that periodically searches the network 106 for unauthorized devices. The system 100 can provide details of the device and the port through which the rogue device is accessing the network. The system 100 can block the switch port to which an authorized device is connected in order to prevent access to the network 106.

System 100 can include network(s) 108, for example, a local area network, campus area network, wide area network, enterprise private network, intranet, extranet, the Internet or most any other network. The devices 108 and components of system 100 can be connected to and communicate with one another via a network or networks 106. Network 106 can provide access to the Internet, an intranet, an extranet, other communication means using protocols that at least, in part, are used for the transfer of data (e.g., hypertext transfer protocol, file transfer protocol, simple mail transfer protocol, trivial file transfer protocol, simple file transfer protocol, network news transfer protocol), and/or combinations thereof. Network 106 can be available over wired and/or wireless connections. In some embodiments, network 106 can be a phone or cellular network, or a proprietary network capable of accepting additional device types. In other embodiments, network 106 can be or include a contact-less data sharing or communication means other than WiFi (e.g., infrared, BlueTooth®, other near-field communication techniques) employing a suitable form of access and traffic control management.

Devices 108 can include most any device, item or element in an organization's network 106, for example, router, switch, server, wireless access point, wireless client, computer, tablet computer, smart phone, thin client, applications, services, resources, printer, fax machine, copier, scanner, multi-function device, mobile device, and most any other network element. In an embodiment, devices 108 include devices running the Windows® operating system and devices having non-Windows operating systems.

In aspects, system 100 is technology agnostic and is operable among various operating systems and device types. Enterprise networks often include multiple networking hardware vendors. The diagnostic complexity in a multi-vendor network is more difficult which has historically translated into more time to diagnose and fix issues. Configuration choices and menus across vendors are not standardized. Technology agnostic system 100 can be deployed as a single implementation that functions across most any platform, or in a multiple vendor implementation that provides modified information depending on the device. Technology agnostic system 100 can be utilized for consolidating and processing a diverse set of information and data related to a network infrastructure.

In an embodiment, system 100 is useful for identifying and resolving issues related to 802.1X network authentication. 802.1X is an IEEE standard for media-level access control, offering the capability to permit or deny network connectivity, control VLAN access and apply traffic policy, based on user or machine identity.

The IEEE 802.1X standard defines the port-based network access control that is used, for example, to provide authenticated WiFi access to corporate networks. This port-based network access control uses the physical characteristics of the 802.1X capable wireless access points infrastructure to authenticate devices attached to a LAN port. Access to the port can be denied if the authentication process fails.

802.1X authentication involves a supplicant, an authenticator, and an authentication server. The supplicant is a client device requesting to access the network. The authenticator is a network device, such as an Ethernet switch or wireless access point and the authentication server is typically a host running software supporting an authentication protocol, for example, an Authentication, Authorization and Accounting (AAA) server. The typical 802.1X authentication progression is a multi-step process including initialization, initiation, Extensible Authentication Protocol (EAP) negotiation and authentication.

Upon initialization, or detection of a new supplicant, the port on the switch (authenticator) is enabled and set to the "unauthorized" state. In this state, only 802.1X traffic is allowed and all other traffic, such as the Internet Protocol (IP), is dropped.

If authentication is successful, the authenticator sets the port to the authorized state and normal traffic is allowed. If authentication is not successful, the port remains in the unauthorized state. When the supplicant logs off, it sends an EAPOL-logoff message to the authenticator and the authenticator sets the port to the unauthorized state, once again blocking all non-EAP traffic.

Troubleshooting 802.1X authentication issues can be a challenging and time consuming task as there can be multiple points of failure in the 802.1X/EAP process. For example, backend communications problems between the access point and the authentication server can cause the authentication process to fail. The authentication process will fail if a secure sockets layer (SSL) tunnel has not been established or if there is an EAP negotiation or credential issue.

Additionally, problems with the supplicant can cause authentication failures. For example, authentication failures can be the result of a problem with certificate validation, a wrong username/password, the username/password may not exist in the LDAP database, an improperly configured authentication type or an incorrectly configured VLAN.

Troubleshooting 802.1X authentication issues can involve, for example, manually accessing logs and settings on the authentication server, reviewing syslog records, checking interface statistics and port status on the authenticator, reviewing client side information, verifying settings on the server, switch or access point, and a variety of other network and 802.1X authentication troubleshooting techniques.

Accessing and evaluating all of the types of information involved in an 802.1X authentication chain can be burdensome. The disclosed system and method can provide a centralized repository by aggregating real-time authentication information from across the network. The data can be searched, filtered and/or sorted to provide the user with information useful for diagnosing and resolving issues. In an embodiment, the system 100 can search, filter and sort network data and provide an output, via out component 112, based on the user's role. For example, the user may any of a system administrator, a network system administrator, a help desk technician, a support specialist, a system analyst, a security specialist, a network manager, a network engineer, an infrastructure analyst, a business analyst or a business executive.

Output component 112 can be configured to provide a role-based view unique to the user's role in the organization. The priorities, responsibilities and privileges may be different for each user of the system based on the user's role in the organization. For example, a network analyst may have responsibilities, tasks, concerns and goals that are different from those of a help desk technician. Output component 112 can be configured to provide a customized role-based view that offers access to the information and functionality useful to fulfilling the user's objectives.

In an embodiment, the system 100 can be used to configure network devices 108 and to resolve network connectivity issues. For example, the system can temporarily disable 802.1X port security to allow client access to the network while an issue is being worked by the IT staff. In other aspects, the system 100 can evaluate the configuration of a device and identify a misconfigured device, for example, by comparing the device configuration against a standard device configuration. Standard device configuration files can be stored by storage component 110. In an embodiment, the system can identify a misconfigured device, access the appropriate stored standard configuration file and automatically configure the misconfigured device.

In other aspects, system 100 can detect or identify unauthorized, or rogue, devices connected to the network 106. In an embodiment, the system 100 can identify the physical and network location of the unauthorized device and can eliminate network access by terminating the network connection between the unauthorized device and an authorized device. In aspects, system 100 can suppress the communications port for most any network device and can turn off the port on a network switch through which an unauthorized device is communicating.

Output component 112 is capable of receiving input from any of the discovery component 102, processing component 104, network(s) 106, devices 108 and storage component 110. The output component 112 can be configured to log or record data, events, operations, warnings, process messages, device changes and system changes associated with the network(s) 106, devices 108 of system 100. In accordance with an embodiment, output component 112 is configured to present a role-based view to a user of the system 100.

Figure 2:
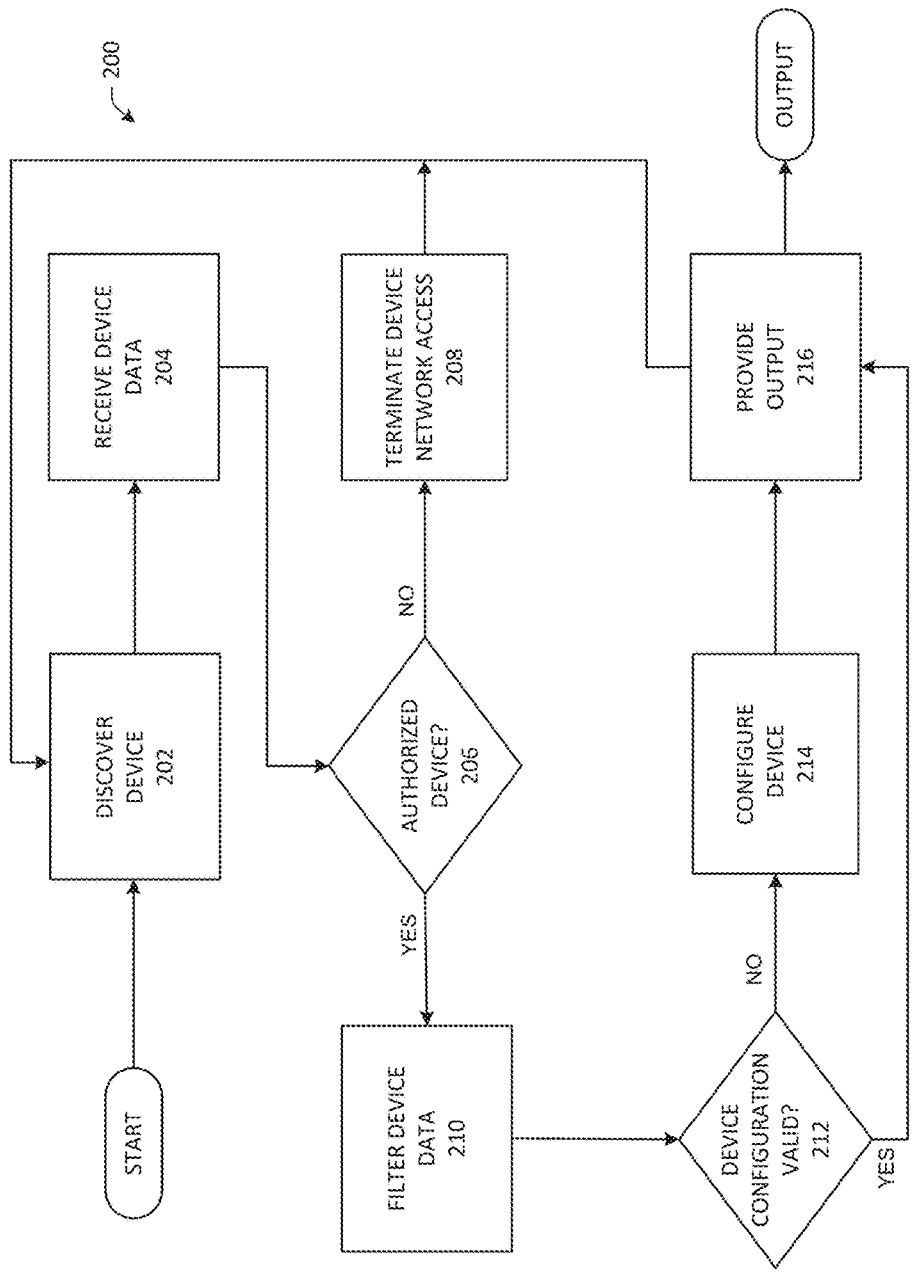
FIG. 2 is an illustration of an example flow chart of a method for operational support for network infrastructures, according to one or more embodiments.

FIG. 2 illustrates a computer implemented method 200 for operational support for network infrastructures in accordance with aspects of the disclosure. Operational support for network infrastructures can include device discovery, receiving device data, determining whether a device is authorized, terminating device network access, filtering device data, determining whether a device configuration is valid, configuring a device and providing an output useful for useful for network infrastructure support, for example, identifying network errors, network health monitoring, troubleshooting authentication failures and monitoring the details of other network or system activities While, for purposes of simplicity of explanation, the one or more methodologies shown herein, e.g., in the form of a flow chart, are shown and described as a series of acts, it is to be understood and appreciated that the disclosure is not limited by the order of acts, as one or more acts may, in accordance with the disclosure, occur in a different order and/or concurrently with other acts from that shown and described herein. For example, those skilled in the art will understand and appreciate that a methodology could alternatively be represented as a series of interrelated states or events, such as in a state diagram. One or more acts described in connection with an embodiment may be combined with acts described in connection with other embodiments. Moreover, not all illustrated acts may be required to implement a methodology in accordance with the disclosure.

Method 200 can begin at 202 by discovering a device 108 on the network 106. For example, a device 108 may be connected to the network 106. In accordance with an embodiment, the method 200 can automatically discover 202 devices 108 on the network 106 using, for example, scheduled network scans, device discovery scripts or in connection with processes associated with the dynamic host configuration protocol (DHCP). A network scan can be manually triggered to discover devices 108 connected to a network or networks 106. In an embodiment, the network 106 can be scanned at pre-determined time intervals to discover and/or identify network devices 108. The network 106 can be continuously scanned for devices 108.

At act 204, the method 200 receives data associated with a discovered device or with the network or most any network accessible device. The method 200 can poll devices to obtain system logs and additional device and network information. The method 200 can obtain authentication, authorization and accounting (AAA) logs, dynamic host configuration protocol (DHCP) logs, SNMP log data, Syslog messages, lightweight directory access protocol (LDAP) information and most any other directory service information. In aspects, the method 200 can receive device data, for example, device type, system name, system description, system capabilities, manufacturer, software and hardware versions, VLAN information, physical location, serial number, asset number, IP address, MAC address, alias name, DNS name, switch name, port name, port description, port number, port speed, port status, authentication status, configuration information and most any other device or network related information.

At act 206, the method 200 determines whether the device 108 discovered at act 202 is authorized to join the network 106. If the device 108 is a rogue device, e.g. not authorized, (206 "NO"), the method 200 proceeds to act 208 where the system terminates the unauthorized device' access to the network 106. If the method 200 determines that the device is authorized (206 "YES"), then the method 200 proceeds to act 210.

At act 210, information related to devices 108 and networks 106 can be filtered or sorted based on a calling-station-id. In an embodiment, a device calling-station-id comprises the IP address or the MAC address associated with the device 108. Presenting the device information in a filtered view can increase the efficiency and effectiveness of troubleshooting efforts. For example, 802.1X network authentication information for a particular device can be aggregated from a number of network resources and presented to the user in a unified view. The aggregation of data based on the calling-station-id of the device can increase the efficiency of network infrastructure support efforts by avoiding the need to manually access multiple devices in order to obtain logs and other device-specific information related to, for example, an authentication failure.

The method proceeds to act 212 where the device configuration is validated. If the device configuration is not valid, (212 "NO"), the method 200 proceeds to act 214 where the system can access, for example, a valid configuration from storage component 110. The valid configuration can be identified based on data received at step 204. For example, the device type and vendor information. The stored configuration can be used to automatically configure the device 108. If the method 200 determines that the device configuration is valid (212 "YES"), then the method 200 proceeds to act 216.

At act 216, the filtered and sorted device information can be displayed to the user. For example, the user may be presented with a role-based view of the device information. In an embodiment, information can be displayed in a dashboard format. The dashboard can be presented to the user based on the user's specific roles and responsibilities. A particular view may include a number of business or technology metrics that can aid the user in determining the status, availability or health of a particular network element. In an embodiment, the user's role can be any of a system administrator, a network system administrator, a help desk technician, a support specialist, a system analyst, a security specialist, a network manager, a network engineer, an infrastructure analyst, a business analyst or a business executive.

In aspects, method 200 can present a unified converged view of network infrastructure information and data useful for assessing network health and for troubleshooting network issues. The unified, converged view saves time and increases the efficiency of network infrastructure support efforts by avoiding the need to manually access multiple devices in order to obtain logs and other device-specific information.

Figure 3:
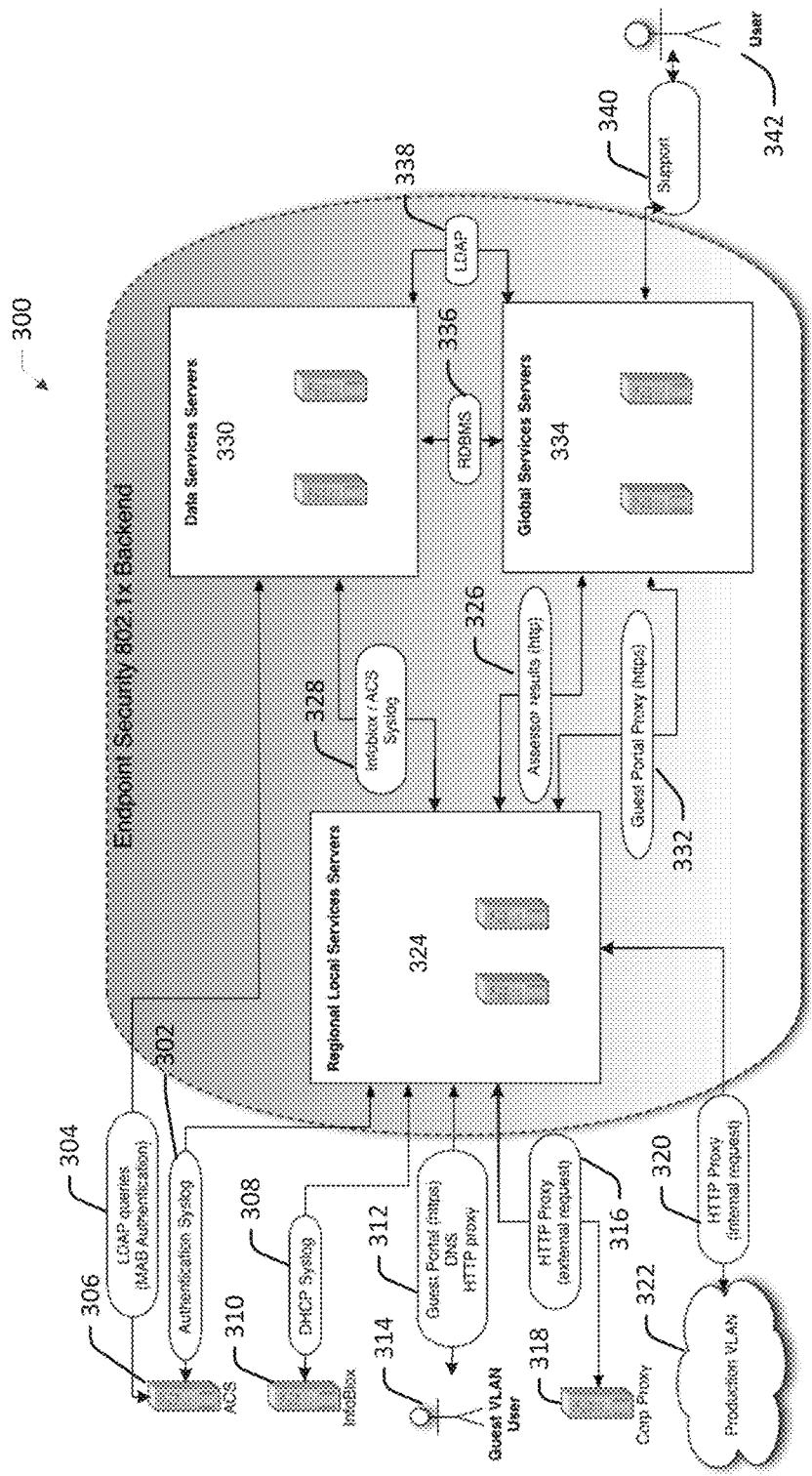
FIG. 3 is an illustration of an example system for operational support for network infrastructures, according to one or more embodiments.

FIG. 3 illustrates a system 300 that facilitates operational support for network infrastructures according to one or more embodiments. The present system is technology agnostic and is useful for most any network infrastructure, network information and devices. As will be described in greater detail below, aspects can discover devices connected to a network, consolidate, organize and process data related to the devices and the network, thereby providing a unified, converged system for operational support for network infrastructures. The system 300 can include access to multiple data feeds, for example, AAA logs, DHCP logs, SNMP log data and LDAP information. The system 300 can provide real-time log monitoring and trend analysis. The system 300 can be utilized to support and troubleshoot, for example, 802.1X (network authentication) related issues without manually accessing backend authentication servers or other network hardware.

In an embodiment, system 300 can obtain, for example, AAA logs, Authentication Syslog information 302, LDAP queries and MAB Authentication data 304 from an Access Control Server (ACS) 306. DHCP Syslog 308 information can be gathered from a DHCP server 310. Guest Portal (HTTPS), DNS and HTTP proxy information 312 and Guest VLAN User 314 information can be acquired. The system 300 can gather HTTP proxy (external requests) 316, related to for example, a corporate proxy server 318 and HTTP proxy requests (internal) 320 from a production VLAN 322.

In aspects, information from the ACS 306, DHCP server 310, Guest VLAN User 314, corporate proxy server 318 and production VLAN 322 may be collected at regional local services servers 324 as part of the endpoint security 802.1X backend 301. The regional local services servers 324 may also collect Assessor results (HTTP) 326 for use by the system 300.

Syslog information 328 can be shared between the regional local services servers 324 and data services servers 330. Assessor information 326 and Guest Portal Proxy (HTTPS) data 332 can be shared between the regional local services servers 324 and global services servers 334. The global services servers 334 can be configured to provide a support and administration website and to function as a Guest Portal Host. Relational database management system (RDBMS) information 336 and LDAP information 338, can be exchanged between the data services servers 330 and the global services servers 334. Device and network information related to most any of the components of system 300 can be gathered for display at, for example, a Support Site (HTTP) 340 for use by the user 342.

System 300 can provide a Support Site (HTTP) 340 for real-time log monitoring useful for network infrastructure support, for example, identifying errors, network health monitoring, troubleshooting authentication failures and details of other network or system activities.

System 300 can obtain or receive information useful for tracking the real-time performance of, for example, the ACS 306, DHCP server 310, corporate proxy server 318, regional local services servers 324, data services servers 330, global services servers 3334. The information can be used, for example, to detect, diagnose and resolve network issues minimizing the impact on network users. System 300 can track network resource response time, availability and uptime.

The disclosed system and method for operational support for network infrastructures are useful for network performance monitoring, alerting, diagnostics, 802.1 X network authentication troubleshooting and reporting that are useful for identifying deficiencies that may impact users and for making informed decisions about future network upgrade and expansion. In an embodiment, a streamlined web-based dashboard can be used to quickly identify, troubleshoot and resolve problems minimizing end-user impact. The disclosed system and method can also reduce downtime, user wait, configuration errors, security threats and increase productivity and user satisfaction.

The system and method provide improved network availability, increased productivity and efficiency and, reduced mean time to resolution (as measured by the average elapsed time from when a network incident is reported until the incident is resolved).

Figure 4:
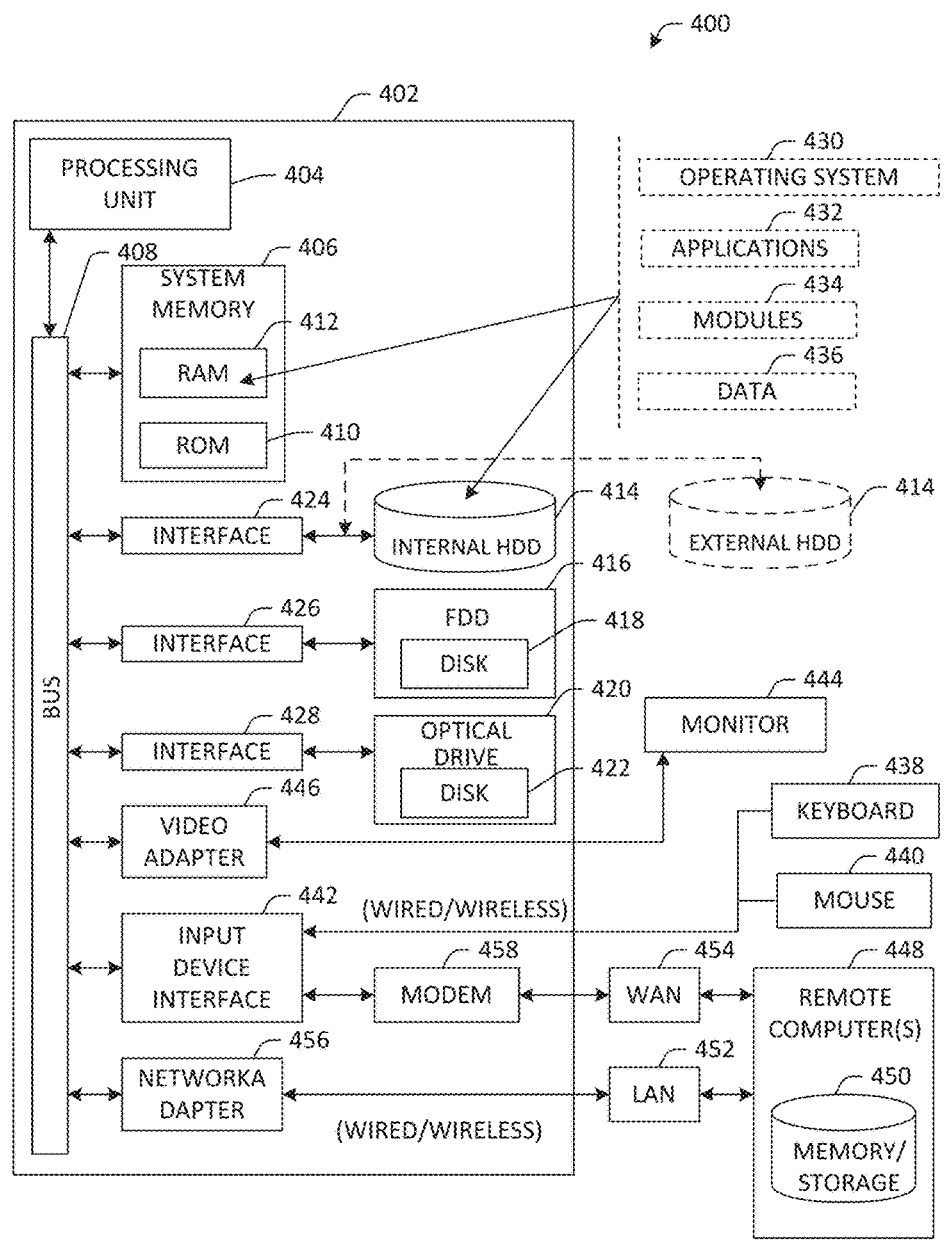
FIG. 4 is an illustration of an example computing environment where one or more of the provisions set forth herein are implemented, according to one or more embodiments.

Referring now to FIG. 4, there is illustrated a block diagram of a computer operable to execute the disclosed architecture. In order to provide additional context for various aspects of the subject innovation, FIG. 4 and the following discussion are intended to provide a brief, general description of a suitable computing environment 400 in which the various aspects of the innovation can be implemented. While the innovation has been described above in the general context of computer-executable instructions that may run on one or more computers, those skilled in the art will recognize that the innovation also can be implemented in combination with other program modules or components and/or as a combination of hardware and software.

Generally, program modules include routines, programs, components, data structures, etc., that perform particular tasks or implement particular abstract data types. Moreover, the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 4, the exemplary environment 400 for implementing various aspects of the innovation includes a computer 402, the computer 402 including a processing unit 404, a system memory 406 and a system bus 408. The system bus 408 couples system components including, but not limited to, the system memory 406 to the processing unit 404. The processing unit 404 can be any of various commercially available processors. Dual microprocessors and other multi-processor architectures may also be employed as the processing unit 404.

The system bus 408 can be any of several types of bus structure that may further interconnect to a memory bus (with or without a memory controller), a peripheral bus, and a local bus using any of a variety of commercially available bus architectures. The system memory 406 includes read-only memory (ROM) 410 and random access memory (RAM) 412. A basic input/output system (BIOS) is stored in a non-volatile memory 410 such as ROM, EPROM, EEPROM, which BIOS contains the basic routines that help to transfer information between elements within the computer 402, such as during start-up. The RAM 412 can also include a high-speed RAM such as static RAM for caching data.

The computer 402 further includes an internal hard disk drive (HDD) 414 (e.g., EIDE, SATA), which internal hard disk drive 414 may also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416 and optical disk drive 420 can be connected to the system bus 408 by a hard disk drive interface 424, a magnetic disk drive interface 426 and an optical drive interface 428, respectively. The interface 424 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 402, the drives and media accommodate the storage of any data in a suitable digital format. Although the description of computer-readable media above refers to a HDD, a removable magnetic diskette, and a removable optical media such as a CD or DVD, other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 412, including an operating system 430, one or more application programs 432, other program modules 434 and program data 436. All or portions of the operating system, applications, modules, and/or data can also be cached in the RAM 412. The innovation can be implemented with various commercially available operating systems or combinations of operating systems.

A user can enter commands and information into the computer 402 through one or more wired/wireless input devices, e.g., a keyboard 438 and a pointing device, such as a mouse 440. Other input devices (not shown) may include a microphone, an IR remote control, a joystick, a game pad, a stylus pen, touch screen, or the like. These and other input devices are often connected to the processing unit 404 through an input device interface 442 that is coupled to the system bus 408, but can be connected by other interfaces, such as a parallel port, an IEEE 1394 serial port, a game port, a USB port, an IR interface, etc.

A monitor 444 or other type of display device is also connected to the system bus 408 via an interface, such as a video adapter 446. In addition to the monitor 444, a computer typically includes other peripheral output devices (not shown), such as speakers, printers, etc.

The computer 402 may operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically includes many or all of the elements described relative to the computer 402, although, for purposes of brevity, only a memory/storage device 450 is illustrated. The logical connections depicted include wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which may connect to a global communications network, e.g., the Internet.

When used in a LAN networking environment, the computer 402 is connected to the local network 452 through a wired and/or wireless communication network interface or adapter 456. The adapter 456 may facilitate wired or wireless communication to the LAN 452, which may also include a wireless access point disposed thereon for communicating with the wireless adapter 456.

When used in a WAN networking environment, the computer 402 can include a modem 458, or is connected to a communications server on the WAN 454, or has other means for establishing communications over the WAN 454, such as by way of the Internet. The modem 458, which can be internal or external and a wired or wireless device, is connected to the system bus 408 via the serial port interface 442. In a networked environment, program modules or components depicted relative to the computer 402, or portions thereof, can be stored in the remote memory/storage device 450. The network connections shown are exemplary and other means of establishing a communications link between the computers can be used.

The computer 402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to wired Ethernet networks used in many offices.

Figure 5:
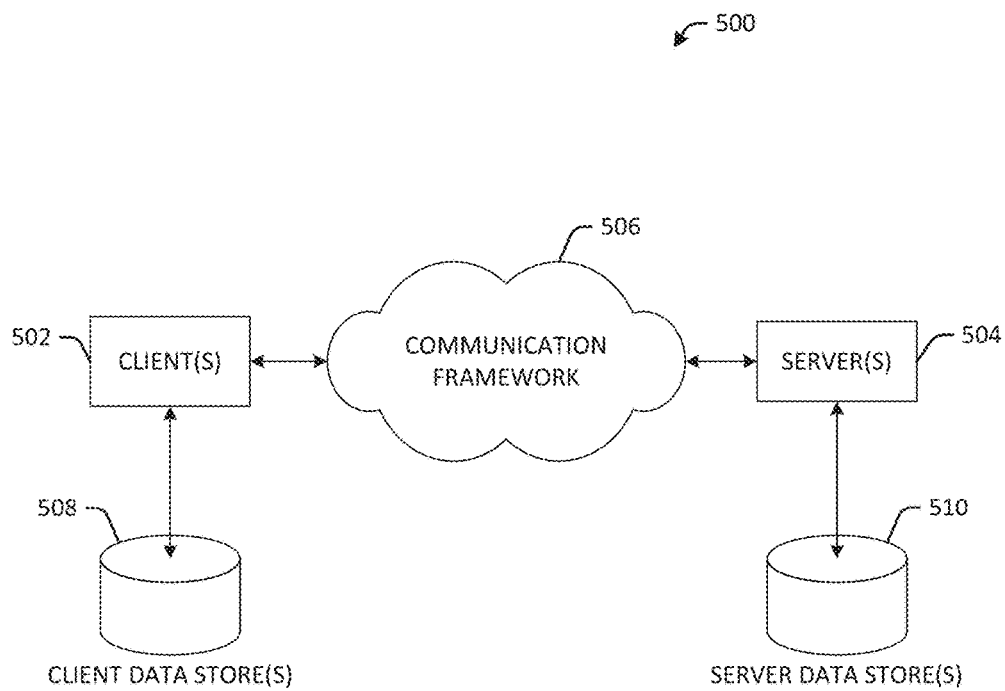
FIG. 5 is an illustration of an example computing environment where one or more of the provisions set forth herein are implemented, according to one or more embodiments.

Referring now to FIG. 5, there is illustrated a schematic block diagram of an exemplary computing environment 500 in accordance with the subject innovation. The system 500 includes one or more client(s) 502. The client(s) 502 can be hardware and/or software (e.g., threads, processes, computing devices).

The system 500 also includes one or more server(s) 504. The server(s) 504 can also be hardware and/or software (e.g., threads, processes, computing devices). The servers 504 can house threads to perform transformations by employing the innovation, for example. One possible communication between a client 502 and a server 504 can be in the form of a data packet adapted to be transmitted between two or more computer processes. The system 500 includes a communication framework 506 (e.g., a global communication network such as the Internet) that can be employed to facilitate communications between the client(s) 502 and the server(s) 504.

Communications can be facilitated via a wired (including optical fiber) and/or wireless technology. The client(s) 502 are operatively connected to one or more client data store(s) 508 that can be employed to store information local to the client(s) 502. Similarly, the server(s) 504 are operatively connected to one or more server data store(s) 510 that can be employed to store information local to the servers 504.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system, comprising:
a microprocessor that executes the following computer executable components stored in a memory:
 a discovery component that determines a first set of device data for a first device and a second set of device data for a second device, the first set of device data comprises a first calling-station id associated with the first device and the second set of device data comprises a second calling-station id associated with the second device;
 a processing component that sorts the first set of device data and the second set of device data based on the first calling-station-id and the second calling-station-id;
 a configuration component that:
  determines either the first device and the second device are misconfigured on a network;
  reconfigures the first device or the second device upon determining the first device or the second device is misconfigured; and
 an output component that, based on a request:
  generates a role-based view of the sorted first set of device data and the sorted second set of device data based on a role included in the request, and
  provides the role-based view to a user.

2. The system of claim 1, wherein the first calling-station-id or second calling-station-id comprises at least one of an Internet Protocol (IP) address or a media access control (MAC) address associated with the device.

3. The system of claim 1, wherein the output component is configured to provide a converged view of the sorted device data.

4. The system of claim 1, wherein the role-based view is unique to a user's role.

5. The system of claim 4, wherein the user's role comprises at least one of a system administrator, a network system administrator, a help desk technician, a support specialist, a system analyst, a security specialist, a network manager, a network engineer or an infrastructure analyst.

6. The system of claim 1, wherein the first set of device data or second set of device data comprises at least one of device type, system name, system description, system capabilities, manufacturer, software version, hardware versions, virtual local area network (VLAN) name, physical location, serial number, asset number, IP address, MAC address, alias name, DNS name, switch name, port name, port description, port number, port speed, port status, power draw, link aggregation, authentication status or configuration information.

7. The system of claim 1, wherein the discovery component collects network information.

8. The system of claim 7, wherein the network information comprises at least one of authentication, authorization and accounting (AAA) logs, dynamic host configuration protocol (DHCP) logs, SNMP log data, Syslog messages, lightweight directory access protocol (LDAP) information or directory services information.

9. The system of claim 7, wherein the network information comprises at least one of authentication requests, authentications by type, error codes, clientless network access, MAC authentication bypass information, backed out ports or guest portal information.

10. The system of claim 1, wherein the configuration component compares a configuration to a standard device configuration.

11. A method, comprising:
employing a processor to execute executable instructions stored within a memory to perform the following:
receiving a first set of device data for a first device and a second set of device data for a second device;
filtering the first set of device data and the second set of device data based on a first calling-station-id of the first device and a second calling-station-id of the second device;
determining the first device and the second device are misconfigured on a network;
reconfiguring the first device or the second device upon determining the first device or the second device is misconfigured;
providing a role-based view of the filtered first device data and the filtered second set of device data based on a role, wherein the role-based view is unique to a user identified in the request.

12. The method of claim 11, wherein filtering the first set of device data and second set of device data comprises at least one of filtering the device information based on an IP address of the device or filtering the device information based on a MAC address of the device.

13. The method of claim 11, wherein the role-based view is a converged view of the filtered first set of device data and second set of device data.

14. The method of claim 11, including
detecting an unauthorized device on the network, and
automatically terminating unauthorized device network access.

15. The method of claim 14, wherein the unauthorized device is at least one of a rogue wireless access point or a rogue network switch.

16. The method of claim 11, including receiving information associated with the network, wherein the information associated with the network comprises at least one of authentication, authorization and accounting (AAA) logs, dynamic host configuration protocol (DHCP) logs, SNMP log data, Syslog messages, lightweight directory access protocol (LDAP) information or directory services information.

17. The method of claim 11, wherein discovering at least one device connected to a network comprises utilizing at least one of a Layer 2 protocol or a Layer 3 protocol.

18. The method of claim 11, wherein receiving data includes polling the first device or the second device and obtaining a system log associated with the first device or the second device.

19. A method, comprising:
receiving a first set of real-time information associated with the first device and a second set of real-time information associated with the second device;
receiving a second set of real-time information associated with the network, wherein the information associated with the network includes at least one of a MAC authentication bypass information, an authentication, an authorization and accounting log, a dynamic host configuration protocol log, a Simple Network Management Protocol log data, a Syslog message, or a lightweight directory access protocol information;
filtering the first set of real-time information and the second set of real-time information based on respective IP addresses or MAC addresses associated with the first device and the second device;
determining the first device based on the first set of real-time information or the second device based on the second set of real-time information is misconfigured;
reconfiguring a device upon determining the first device or the second device is misconfigured; and
generating an output based on the filtered first set of device information and the filtered second set of device information, wherein the output is unique to a user's role.

20. The method of claim 19, wherein the output unique to a user's role is a converged view.

* * * * *